(12) United States Patent
Hunt

(10) Patent No.: US 6,843,108 B1
(45) Date of Patent: Jan. 18, 2005

(54) HYDROSTATIC TEST PLUG FOR WATER SERVICE LINE

(76) Inventor: Mitchell Hunt, 1165 Park Ave., Murfreesboro, TN (US) 37129

(*) Notice: Subject to any disclaimer, the term of this patent is extended or adjusted under 35 U.S.C. 154(b) by 0 days.

(21) Appl. No.: 10/608,458

(22) Filed: Jun. 27, 2003

(51) Int. Cl.[7] .......................... G01M 3/02; F16L 55/10
(52) U.S. Cl. .......................... 73/49.8; 138/89; 138/90
(58) Field of Search .................. 73/49.1, 49.8; 138/89, 90

(56) References Cited

U.S. PATENT DOCUMENTS

| | | | | |
|---|---|---|---|---|
| 3,583,239 A | * | 6/1971 | Paine et al. ............... | 73/49.8 |
| 5,074,336 A | * | 12/1991 | Black ............................ | 138/89 |
| 5,555,998 A | * | 9/1996 | Coppola ........................ | 220/484 |

* cited by examiner

*Primary Examiner*—Daniel S. Larkin
(74) *Attorney, Agent, or Firm*—James R. Frederick; Ware, Fressola, Van Der Sluys & Adolphson LLP

(57) ABSTRACT

A pipe test plug for sealing and pressure testing a water utility supply line or other pressurized pipe has a plug body sized and shaped for insertion into an open end of a water supply line. The plug body has an inner and an outer end, with first and second spaced apart annular seals supported on the plug body. The annular seals and plug body together seal the water supply line when the pipe test plug is inserted therein. A securing member extends through at least one portion of the water supply line and into the plug body inserted therein for securing the pipe test plug in the water supply line under test pressure, the securing member being received in the plug body between the second annular seal and the other end of the plug body. The plug body may include first and second cylindrical seal plates each defining a peripheral groove for respectively receiving and supporting the first and second annular seals. The cylindrical seal plates are connected by web portions. A mounting tab joined with the plug body and extending generally along the plug body and spaced therefrom to accommodate the distal end of a water supply line. The mounting tab defining an opening for guiding the securing member through the supply line and into the plug body. An insertion stop positions the test plug in the water service line.

21 Claims, 3 Drawing Sheets

HYDROSTATIC TEST PLUG FOR WATER SERVICE LINE

FIELD OF THE INVENTION

The invention herein relates to a hydrostatic test plug and a method for using the hydrostatic test plug for efficient sealing and testing of a water utility service line.

BACKGROUND OF THE INVENTION

Providing water service to a home or small business is often a multi-step process. In areas of new construction, such as a subdivision, a water main will be installed and individual service lines will be connected to the water main for supplying water to the homes or other buildings built or to be built along the water main. To this end, a corporation valve and/or a curb valve and box are connected to the water main for each location, and a portion of service line is connected extending from the corporation valve and/or curb valve and box. Sometimes the meter is also set, and a portion of the service line is connected to the building side of the meter.

It is necessary to seal off the extending portion of the service line, in order to test the devices connecting the service line to the water main. If there are no leaks in the corporation valve, curb stop and box, water meter, and connecting pipes and joints, then the water main can be considered completed, and it can be covered over and service can be established through the water main.

Therefore, it is necessary to terminate the distal end of service line for purposes of testing, and it is also desirable to close and seal the service line until service to the home or building is ready to be established. Under present practice, a valve is installed at the distal end of the service line. Installing a valve for purposes of testing and temporary shutoff has several drawbacks. These drawbacks include the time and labor costs necessary to install the valve, as well as the cost of the valve. The valve and its connection to the service line also introduce another potential source of leakage, and a valve is generally simple to operate and therefore subject to vandalism.

Accordingly, there is a need for better equipment and methods for testing the connections of service lines to water mains, and for temporarily sealing the service lines prior to connection of the service line to a building.

SUMMARY OF THE INVENTION

It is a principal object of the invention herein to provide a means for sealing and pressure testing the connection of a water service line to a water main.

It is an additional object of the invention herein to provide a device for the foregoing purpose that is low in cost and easy to install.

It is a further principal object of the invention herein to provide a method of pressure testing the connections between a water service line and a water main without installing a valve on the distal end of the water service line.

In carrying out the foregoing objects of the invention, a pipe test plug is provided for sealing and pressure testing a water utility service line. The pipe test plug has a plug body sized and shaped for insertion into an open end of the service line, the plug body having an outer end and an inner end. First and second spaced apart annular seals are supported on the plug body between the outer and inner end thereof, the annular seals and plug body together sealing the water service line when the pipe test plug is inserted therein. The pipe test plug further comprises means for securing the plug body and annular seals supported thereon in the distal end of the water service line.

According to further aspects of the invention, the means for securing the plug body in the open end of the water service pipe is a fastener passing through the water service line and into the plug body. The fastener preferably extends through the plug body and through another opening in the water service line, wherein the fastener spans the water service line and the plug body.

In additional aspects of the invention herein, the pipe test plug includes a mounting tab joined with the plug body at or near the outer end thereof and extending along the water service line when the pipe test plug is inserted therein. The mounting tab defines guide means for introducing the fastener to the water service line and the plug body received therein. The guide means may be an opening which guides a drill for forming a hole in the pipe and the plug body for receiving a fastener, or alternatively the guide means may be an opening receiving and positioning a self-tapping screw, so that the screw may be driven through the service line and into the plug body received therein.

The mounting tab may include a stop so that the pipe test plug may be inserted into the open end of the water service line by a predetermined distance. A separate insertion stop may also be provided for that purpose.

Also according to aspects of the invention herein, the plug body has first and second spaced apart cylindrical seal plates connected by a web portion of the plug body, the first and second cylindrical seal plates each having a cylindrical outer surface defining a groove for receiving and supporting one of the first and second spaced apart annular seals, respectively. The seals are sufficiently spaced apart to align the plug body with the water service line.

The first and second seal plates may be at the inner and outer ends of the plug body. Alternatively, the plug body may further include an inner end plate connected to the first cylindrical seal plate by a web portion, and the inner end plate may be of smaller diameter to facilitate inserting the pipe test plug in the open end of the water service line. The web portion preferably tapers between the inner end plate and the first cylindrical seal plate, also for guiding the pipe plug into the open end of the water service line. The plug body may also include an outer end plate positioned at the outer end of the plug body, which may be connected to the second cylindrical seal plate by a web portion. The mounting tab and insertion stop preferably extend from the plug body at the outer end plate.

The web connecting the cylindrical seal plates and end plates is preferably "X" shaped, and includes a web portion between the second seal plate and the end plate that is sufficiently thick to accommodate the fastener. The mounting tab is positioned to guide the fastener to and into the thick web portion. Alternatively, the fastener may be received in the end plate.

The plug body is preferably fabricated of polypropylene or another synthetic material which is sufficiently rigid to withstand the pressure within the water service pipe without deforming and creating leakage.

The foregoing and other objects and features of the invention will in part be readily understood by one skilled in the art and will, in part, appear in the following detailed description of a preferred embodiment, taken together with the drawings.

BRIEF DESCRIPTION OF DRAWINGS

The same reference numerals refer to the same elements throughout the various figures.

DETAILED DESCRIPTION OF PREFERRED EMBODIMENT

The invention herein relates to a hydrostatic pipe test plug 10 with the capability of sealing the end of a water service line or other pipe for testing at pressures of at least 500 psi.

Figure 3:
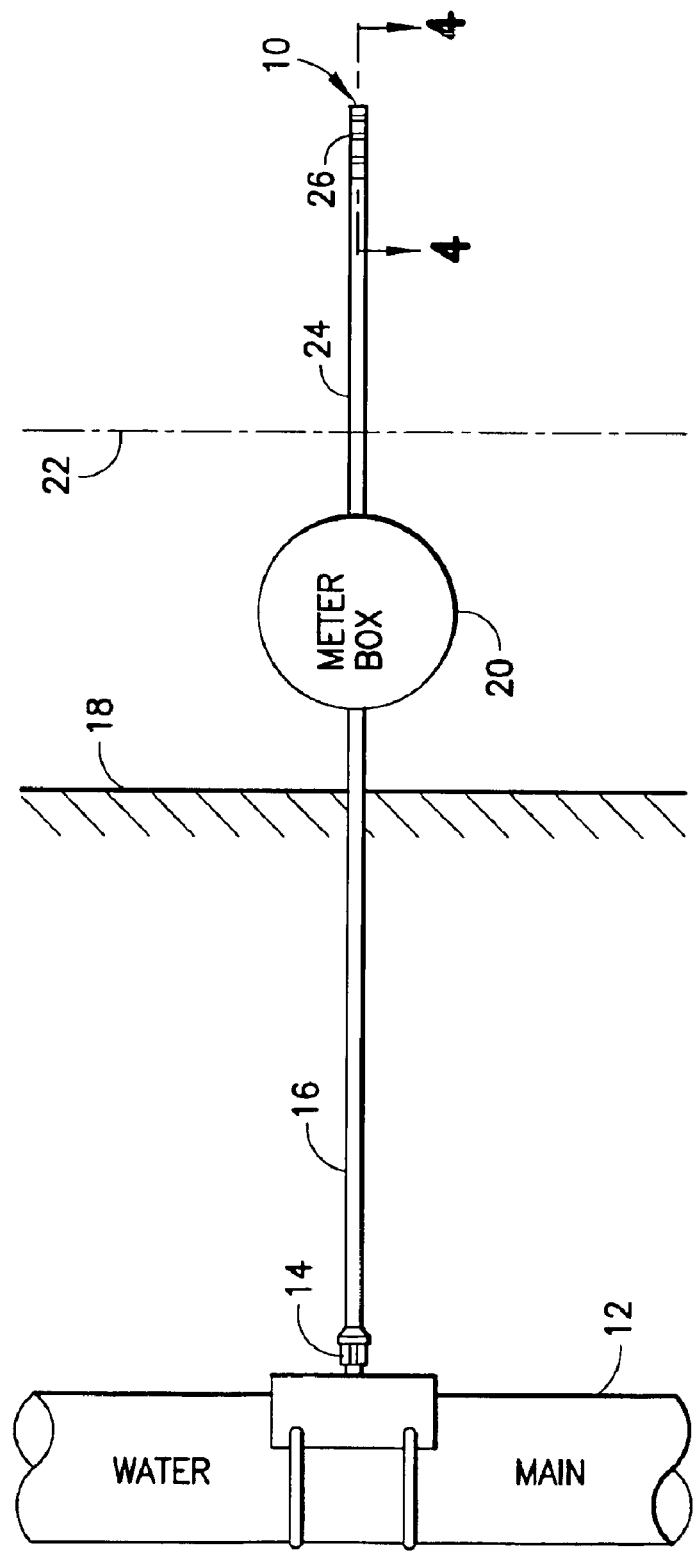
FIG. 3 is a schematic plan view of a water main and water service line installation, with the pipe test plug of FIG. 1 installed at the distal end of the water service line.

FIG. 3 illustrates the environment in which the pipe test plug 10 is used. A water main 12 is typically buried in or adjacent to a street for supplying water to buildings along the street. At a location of a building lot or building along the water main, a corporation valve 14 is secured to the water main 12. The corporation valve is so named because it denotes the water company's connection of a service line to the water main. A first length 16 of service line, which is typically copper pipe, extends from the corporation valve past the curb or curb line 18 to a meter box 20. The meter box 20 usually contains a curb stop valve and a water meter, and the meter box 20 is typically located in a utility easement between the curb line 18 and an easement line 22. A second length of service line 24 extends from the meter box, where it is connected with the meter, to a distal end 26.

The service line 24 eventually connects the meter box with water pipes in a building; however, many times the connection to a building may not be completed at the time of installation of the water main, corporation valve and meter box. This is a very typical situation when a water main is being placed for a subdivision and no homes have yet been constructed. Nevertheless, it is necessary to test for leaks in the corporation valve and its connection to the water main, the first length of service line 16, and the valve and meter within the meter box, if installed. Sometimes the test is performed at a distal end of the first length of service line 16, i.e. the meter box 20 and meter are installed later. It is necessary to test the connection to the water main so that water service may be established in the water main and made available to buildings along the water main, as required.

Test pressures applied to the water main and the connected elements may be on the order of 500 psi and greater, so it is necessary to securely seal the distal end 26 of the service line 24, or the distal end of the first portion 16 of water service line, if that is all that is installed at the time of the test. In the past, this has been accomplished by installing a valve at the distal end of the service line, but this is expensive in terms of both the valve and the labor to install it, and also introduces another source of potential leakage.

Figure 1:
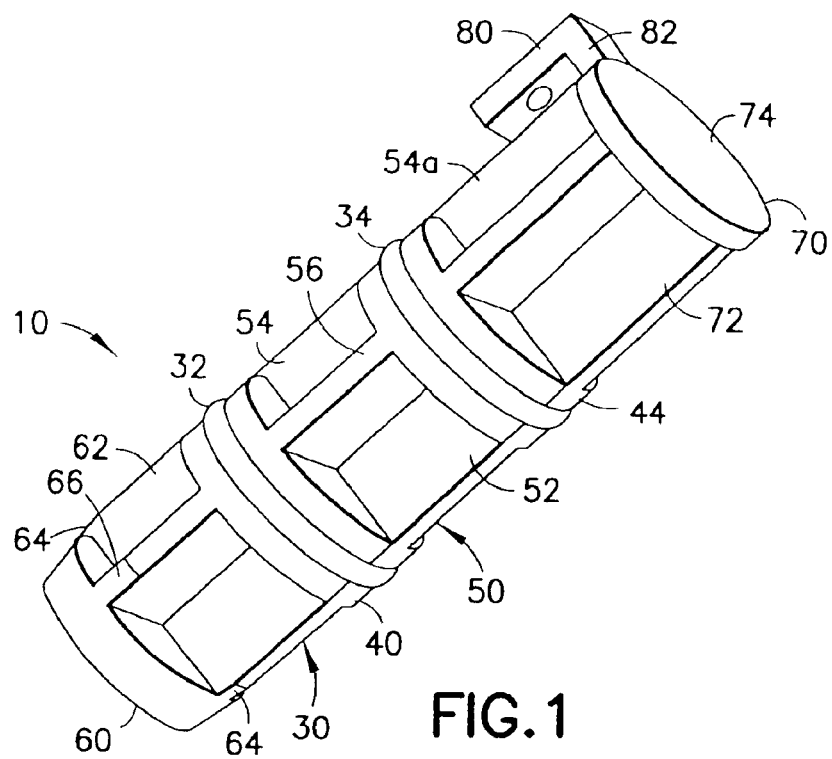
FIG. 1 is a perspective view of a pipe test plug according to the invention herein.
Figure 2:
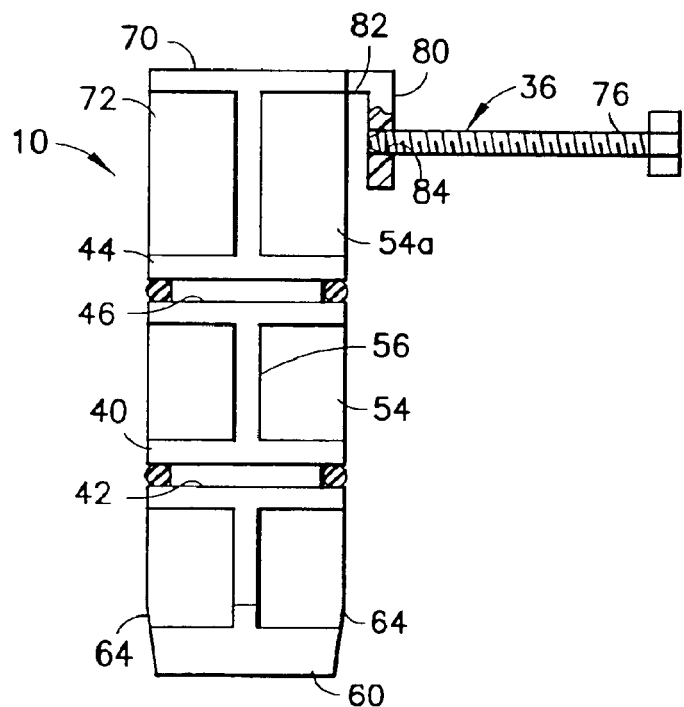
FIG. 2 is a side elevation view of the pipe test plug of FIG. 1, including a fastening member.
Figure 5:
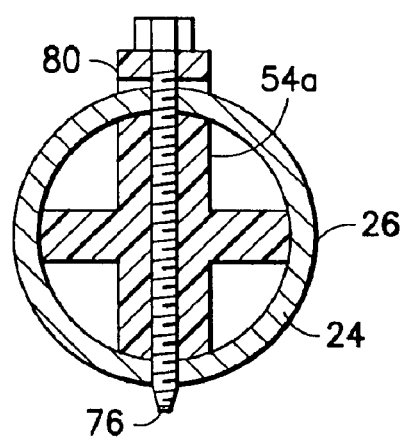
FIG. 5 is a sectional view of the test plug of FIG. 1, taken along the lines 5—5 of FIG. 4.

The hydrostatic pipe test plug 10 is used to quickly and inexpensively seal the distal end 26 of the service line 24. With reference to FIGS. 1, 2 and 5, the pipe test plug 10 generally comprises a plug body 30 supporting first and second annular seals 32 and 34, respectively, and means 36 for securing the pipe test plug 10 in the distal end of a portion of water service line.

The plug body 30 includes a first sealing plate 40, which is preferably cylindrical defining a peripheral groove 42 best seen in FIG. 2. The groove 42 receives the first annular seal 32. A second, spaced-apart cylindrical sealing plate 44 defines a peripheral groove 46, also best seen in FIG. 2, which receives the second annular seal 34. The first and second sealing plates 40, 44 and the first and second annular seals 32, 34 respectively supported thereon are spaced apart to assure that the plug is aligned with the water service line. This assures that the seals are not inclined with respect to the axis of the water service line, and this is important so that the seals will maintain their position and sealing function under test pressures. If desired, an additional seal plate and seal may also be provided, although testing with a two-seal embodiment has been satisfactory.

The plug body 30 has a web 50, a web portion 52 of which connects and spaces the first and second sealing plates 40 and 42. The web 50 is generally "X" shaped when viewed in cross section, having orthogonal panels 54 and 56. The web 50 is not essential, i.e. a solid portion of the plug body 30 could function to space and connect the seal plates 40 and 44, but the web configuration is desirable to save material and weight in the pipe test plug 10. It will also be appreciated that other configurations of the web could be utilized.

An inner end plate 60 is provided spaced inwardly from the first seal plate 40 by web portion 62 of web 50. The inner end plate 60 is of smaller diameter than the seal plate 40, and the outer surfaces 64 of panel 54 of the web portion 62 and outer surfaces 66 of the panel 56 of the web portion 62 taper adjacent the inner end plate 60. This facilitates inserting the test plug 10 into the distal end 26 of the water service line.

An outer end plate 70 is provided spaced from the second seal plate 44 by web portion 72 of web 50. The outer end plate 70 provides an end surf ace 74 which facilitates inserting the pipe test plug into the service line, such as by tapping it with a hammer, as the plug body 30 and the annular seals 32 and 34 thereof fit very snugly in the water service line.

The inner end plate 60 and outer end plate 70 form the inner and outer ends of the test plug, but it should be noted they are also not essential. The seal plates 40, 44 themselves can provide inner and outer ends of the plug body 30, and particularly by providing the first or inner seal plate in greater thickness and with a taper adjacent the seal and toward the inner end, and by providing the second or outer end plate in a thicker dimension for cooperating with the securing means 36, as more fully discussed below.

Figure 4:
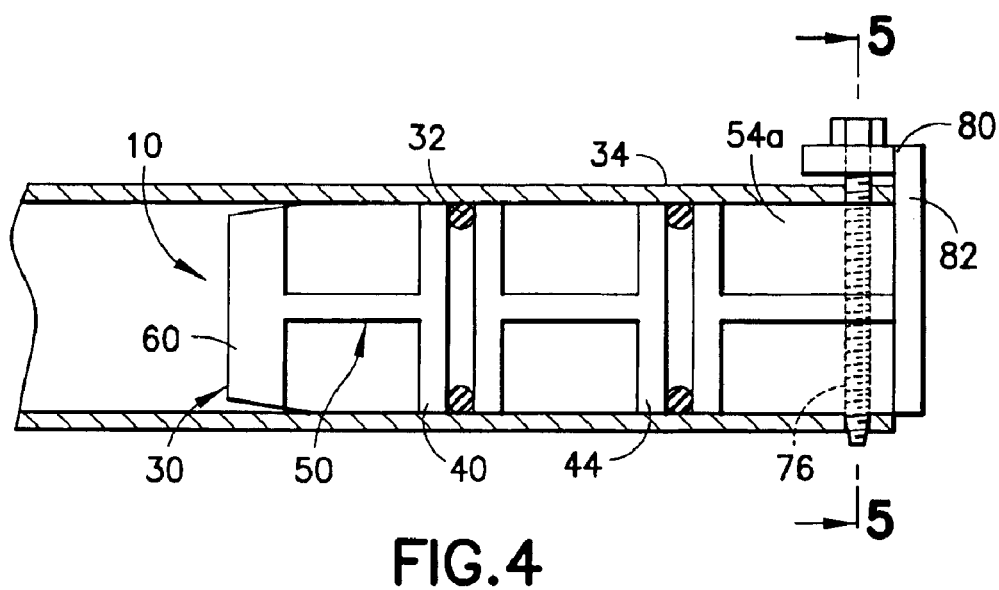
FIG. 4 is a sectional view of the pipe test plug of FIG. 1 installed in the distal end of the water service line, taken along the lines 4—4 of FIG. 3.

The securing means 36 is preferably a self-tapping screw 76 pre-mounted in a mounting tab 80. With reference to FIGS. 4 and 5, when the pipe test plug 10 is installed in the distal end 26 of the service line 24, the self-tapping screw 76 extends through the service line, through the plug body 30, and through the service line on the opposite side thereof. It is preferable that the screw 76 extends through web portion 72, and the panel 54 is thicker in its portion 54a to better accommodate the screw 76.

The mounting tab 80 serves as a guide for the self-tapping screw 76 or other fastener. The mounting tab 80 is mounted to and extends from the outer end plate 70 by a stop 82, wherein the stop 82 limits the insertion of the pipe test plug 10 into the distal open end 26 of the water service line 24. The stop 82 also supports the mounting tab 80 spaced from the plug body 30, so that the end 26 of the service line 24 can be received between the mounting tab 80 and the plug body 30, as best seen in FIGS. 4 and 5. The stop may also be provided as an extending flange.

With reference to FIG. 2, self-tapping screw 76 is received in opening 84 in the mounting tab 80, so that after the pipe test plug 10 is inserted in the end of the water service line, the self-tapping screw will be guided through the wall of the service line, the web panel 54a of the plug body 30, and the opposite side of the distal end 26 of the service line 24, as shown in FIG. 5. The hole 84 of the mounting tab 80 may also be used as a guide hole for drilling an opening through the distal end 26 of the water service line 24 and the plug body, for receiving a screw or other type of fastener providing the securing means 36.

The plug body 30, mounting lab 80 and stop 82 are preferably integrally formed of a substantially rigid polymeric material, and polypropylene is suitable for this purpose. The first and second seals 32, 34 are standard O-rings, fabricated of Buna-N.

For use in a water service line having inside diameter of 1.0", the plug body 30, including particularly the first and second sealing plates 40 and 44, may have a diameter of 0.995". The grooves 42 and 46 in the seal plates 40, 44 may have a depth of 0.120". The diameter of the O-rings may be 1", and the thickness of the O-ring seals may be ⅛". It will be appreciated that similar tolerances between the inside diameter of a water service line and the diameter of the plug body 30 and seals would be utilized when fabricating a pipe test plug for water service lines of other diameters.

The pipe test plug 10 is easily used for pressure testing a water main and/or the service lines, valves, meters and the like connected thereto. The pipe test plug is merely inserted in the distal end of the water service line, including tapping on the end surface 74 as required to seat the pipe test plug 10 against the stop 82. The self-tapping screw 76 or other fastening means is inserted through the pipe and into the plug body 30, preferably extending through the plug body 30 and the opposite portion of the water service line. A hole may be formed through the pipe and a portion of the plug body prior to inserting the fastening means. Pressure is then applied to the water system, and the pipe test plug 10 withstands test pressures in excess of 500 psi. The pipe test plug 10 may be left in the distal end of the water service line until the water service line is connected to a building.

Accordingly, a hydrostatic pipe test plug has been described which admirably achieves the objects of the invention herein. It would be appreciated that the embodiment described above is illustrative only, and that various changes and modifications may be made by those skilled in the art without departing from the spirit and scope of the invention, which is limited only by the following claims.

I claim:

1. A pipe test plug for sealing and pressure testing a water utility supply line or other pressurized pipe, the test plug comprising:
   a) a plug body sized and shaped for insertion into an open end of a water supply line, the plug body having an inner and an outer end;
   b) first and second spaced apart annular seals supported on the plug body, the first annular seal positioned closer to the inner end of the plug body than the second annular seal and the second annular seal positioned closer to the outer end of the plug body than the first annular seal, the annular seals and plug body together sealing the water supply line when the pipe test plug is inserted therein; and
   c) securing means for extending through at least one portion of the water supply line and into the plug body inserted therein for securing the pipe test plug in the water supply line under test pressure, the securing means received in the plug body between the second annular seal and the outer end of the plug body.

2. A pipe test plug as defined in claim 1 wherein the plug body includes first and second cylindrical seal plates, the first and second seal plates each defining a peripheral groove for respectively receiving and supporting the first and second annular seals.

3. A pipe test plug as defined in claim 2 wherein the first and second cylindrical seal plates are connected by a web portion.

4. A pipe test plug as defined in claim 3 and further comprising a mounting tab joined with the plug body and extending generally along the plug body and spaced therefrom to accommodate the distal end of the water supply line, the mounting tab defining an opening for guiding the securing means through the supply line and into the plug body.

5. A pipe test plug as defined in claim 4 wherein the securing means is a screw.

6. A pipe test plug as defined in claim 5 wherein the securing means is a self-tapping screw received and retained in the opening defined in the mounting tab, the self-tapping screw thereby being positioned for insertion through the supply line and into the plug body.

7. A pipe test plug as defined in claim 4 wherein the mounting tab is joined with the plug body by a stop extending from the plug body at or near the outer end thereof, the stop engaging the distal end of the water supply line when the pipe test plug is inserted therein.

8. A pipe test plug as defined in claim 7 wherein the securing means is a screw.

9. A pipe test plug as defined in claim 8 wherein the securing means is a self-tapping screw received and retained in the opening defined in the mounting tab, the self-tapping screw thereby being positioned for insertion through the supply line and into the plug body.

10. A pipe test plug as defined in claim 7 and further comprising an outer end plate connected by another web portion to the second cylindrical seal plate, the outer end plate defining the outer end of the plug body.

11. A pipe test plug as defined in claim 10 wherein the web portion connecting the outer end plate to the second cylindrical seal plate is disposed to receive the securing means guided into the plug body by the mounting tab.

12. A pipe test plug as defined in claim 10 and further comprising an inner end plate connected by a further web portion to the first seal plate, the inner end plate being smaller than the first cylindrical seal plate to facilitate guiding the plug body into the distal end of the water supply line.

13. A pipe test plug as defined in claim 1 and further comprising a mounting tab joined with the plug body and extending generally along the plug body and spaced therefrom to accommodate the distal end of the water supply line, the mounting tab defining an opening for guiding the securing means through the supply line and into the plug body.

14. A pipe test plug as defined in claim 13 wherein the mounting tab is joined with the plug body by a stop extending from the plug body at or near the outer end thereof, the stop engaging the distal end of the water supply line when the pipe test plug is inserted therein.

15. A pipe test plug for sealing and pressure testing a water utility supply line or other pressurized pipe, the pipe test plug comprising:
   a) a plug body sized and shaped for insertion into an open distal end of a water supply line or other similar pipe, the plug body having
      1) first and second spaced-apart cylindrical seal plates connected by a web portion of a web, the first and second cylindrical seal plates each respectively defining a peripheral groove, 2) an inner end plate spaced apart from the fir cylindrical seal plate by another web portion of the web, the inner end plate being smaller than the first cylindrical seal plate for facilitating inserting the test plug into the open distal end of the water supply line, and 3) an outer end plate spaced apart from the second cylindrical seal plate by a further web portion of the web and defining an outer end of the plug body;

b) first and second annular O-ring seals deployed respectively in the grooves defined by the first and second cylindrical seal plates, wherein when the plug is inserted into the open distal end of the water supply line, the first and second seals seal to the interior of the water supply line and the seals and the plug body together seal the water supply line; and c) a mounting tab and stop integrally joined with the outer end plate of the plug body,
  1) the stop extending outwardly from the outer end plate and limiting insertion of the pipe test plug into the open distal end of the water service line,
  2) the mounting tab extending from the stop away from the outer end of the plug body and spaced from the plug body to accommodate the water service line between the mounting tab and the plug body, and
  3) the mounting tab defining a guide opening for guiding a fastener through the water supply line and into the plug body between the second annular O-ring seal and the outer end of the plug body, thereby securing the pipe test plug in the distal end of the water supply line.

16. A pipe test plug as defined in claim 15 wherein the fastener is a self-tapping screw received and retained in the opening defined in the mounting tab, the self-tapping screw thereby being positioned for insertion through the supply line and into the plug body.

17. A method of pressure testing a water supply line connected to a water main, comprising the steps of:

a) providing a pipe test plug sized and shaped for sealing the distal end of a water supply line upon insertion therein;

b) inserting the pipe test plug in the distal end of the water supply line;

c) securing the pipe test plug in the distal end of the water supply line by forming a first opening in the water supply line and inserting a fastener through the first opening and into the pipe test plug; and d) pressurizing the water main and water supply line and inspecting it for leaks.

18. A method of pressure testing a water supply line as defined in claim 17 wherein the step of securing the pipe test plug includes inserting the fastener all the way through the pipe test plug and through a second opening in the water supply line.

19. A method of pressure testing a water supply line as defined in claim 18 wherein the fastener is a self-tapping screw and the step of inserting the fastener through the first opening, the test plug and the second opening includes forming the openings with the self-tapping screw.

20. A method of pressure testing a water supply line as defined in claim 17 wherein the fastener is a self-tapping screw and the step of securing the pipe test plug through the first opening includes forming the first opening with the self-tapping screw.

21. A pipe test plug for sealing and pressure testing a water utility supply line or other pressurized pipe, the test plug comprising:

a) a plug body sized and shaped for insertion into an open end of a water supply line, the plug body having an inner and an outer end;

b) the first and second spaced apart annular seals supported on the plug body, the first annular seal positioned closer to the inner end of the plug body than the second annular seal and the second annular seal positioned closer to the outer end of the plug body than the first annular seal, the annular seals and plug body together sealing the water supply line when the pipe test plug is inserted therein; and c) securing means for extending through at least one portion of the water supply line and into the plug body inserted therein for securing the pipe test plug in the water supply line under test pressure.

* * * * *

UNITED STATES PATENT AND TRADEMARK OFFICE
CERTIFICATE OF CORRECTION

PATENT NO. : 6,843,108 B1
DATED : January 18, 2005
INVENTOR(S) : Hunt

It is certified that error appears in the above-identified patent and that said Letters Patent is hereby corrected as shown below:

Title page,
Item [57], ABSTRACT,
Line 2, "scaling" should be -- sealing --.

Column 4,
Line 32, "surf ace" should be -- surface --.

Column 7,
Line 1, "fir" should be -- first --.

Signed and Sealed this

Twenty-second Day of November, 2005

JON W. DUDAS
*Director of the United States Patent and Trademark Office*